United States Patent
Yiu et al.

(10) Patent No.: US 12,108,292 B2
(45) Date of Patent: Oct. 1, 2024

(54) MULTI-CONNECTIVITY USING TIME DIVISION MULTIPLEXING

(71) Applicant: Apple Inc., Cupertino, CA (US)

(72) Inventors: Candy Yiu, Portland, OR (US); Yi Guo, Shanghai (CN); Jaemin Han, Portland, OR (US); Oluwaseyi Omotere, Houston, TX (US)

(73) Assignee: Apple Inc., Cupertino, CA (US)

( * ) Notice: Subject to any disclaimer, the term of this patent is extended or adjusted under 35 U.S.C. 154(b) by 438 days.

(21) Appl. No.: 17/276,091

(22) PCT Filed: Sep. 23, 2019

(86) PCT No.: PCT/US2019/052398
§ 371 (c)(1),
(2) Date: Mar. 12, 2021

(87) PCT Pub. No.: WO2020/068648
PCT Pub. Date: Apr. 2, 2020

(65) Prior Publication Data
US 2022/0046500 A1    Feb. 10, 2022

Related U.S. Application Data

(60) Provisional application No. 62/737,075, filed on Sep. 26, 2018.

(51) Int. Cl.
*H04W 36/00*    (2009.01)
*H04W 74/0833*  (2024.01)
*H04W 76/30*    (2018.01)

(52) U.S. Cl.
CPC . *H04W 36/00837* (2018.08); *H04W 36/0058* (2018.08); *H04W 36/0069* (2018.08);
(Continued)

(58) Field of Classification Search
CPC ............ H04W 24/10; H04W 36/0058; H04W 36/0069; H04W 36/00837;
(Continued)

(56) References Cited

U.S. PATENT DOCUMENTS 9,591,499 B2    3/2017  Comsa et al.
2012/0281563 A1  11/2012 Comsa
(Continued)

FOREIGN PATENT DOCUMENTS

CN    103583064        2/2014
KR    100810325 B1     3/2008
(Continued)

OTHER PUBLICATIONS

International Search Report and Written Opinion for International Application No. PCT/US2019/052398, date mailed Jan. 10, 2020, 13 pgs.
(Continued)

*Primary Examiner* — Matthew W Genack
(74) *Attorney, Agent, or Firm* — Kowert, Hood, Munyon, Rankin & Goetzel, P.C.

(57) ABSTRACT

Techniques to configure a UE for time-division multiplexing (TDM)-based multi-connectivity handover with a source base station (SBS) and a target base station (TBS) include encoding UE capability information for transmission to the SBS. The UE capability information indicates the UE supports the TDM-based multi-connectivity handover. A measurement report is encoded for transmission to the SBS, the measurement report triggered based on a measurement event configured by the SBS. RRC signaling from the SBS is decoded, which includes a handover command in response to the measurement report. The handover command indicates a TDM pattern for multi-connectivity with the SBS and the TBS during the handover. UL data is encoded for
(Continued)

transmission to the SBS. Transmission of the UL data to the SBS is time-division multiplexed with communications between the UE and the TBS during the handover based on the TDM pattern.

20 Claims, 5 Drawing Sheets

(52) U.S. Cl.
CPC ... *H04W 36/0085* (2018.08); *H04W 74/0841* (2013.01); *H04W 76/30* (2018.02)

(58) Field of Classification Search
CPC ......... H04W 36/0085; H04W 36/0088; H04W 36/0094; H04W 74/08; H04W 74/0833; H04W 74/0841; H04W 76/30; H04W 76/32; H04W 76/34
See application file for complete search history.

(56) References Cited

U.S. PATENT DOCUMENTS

| | | | |
|---|---|---|---|
| 2015/0312787 A1* | 10/2015 | Das | H04W 24/10 370/329 |
| 2015/0350969 A1 | 12/2015 | Dudda | |
| 2017/0111837 A1 | 4/2017 | Ahn et al. | |
| 2018/0027593 A1* | 1/2018 | Lee | H04W 74/008 370/329 |
| 2018/0249463 A1 | 8/2018 | Huang | |
| 2018/0279186 A1* | 9/2018 | Park | H04W 36/30 |
| 2019/0223073 A1* | 7/2019 | Chen | H04W 36/0058 |
| 2019/0253945 A1* | 8/2019 | Paladugu | H04W 76/27 |
| 2019/0313272 A1* | 10/2019 | Zhou | H04W 24/10 |
| 2019/0313298 A1* | 10/2019 | Rico Alvarino | H04W 36/0069 |

FOREIGN PATENT DOCUMENTS

| | | |
|---|---|---|
| WO | 2010088601 A1 | 8/2010 |
| WO | 2011103745 A1 | 9/2011 |
| WO | 2017138978 | 8/2017 |
| WO | 2017193940 | 11/2017 |
| WO | 2018044693 | 3/2018 |
| WO | 2018106429 | 6/2018 |
| WO | 2018144758 | 8/2018 |

OTHER PUBLICATIONS

International Preliminary Report on Patentability for International Application No. PCT/US2019/052398, date mailed Sep. 25, 2020, 5 pgs.
Office Action for CN Patent Application No. 201980061020.0; Jan. 11, 2024.
Huawei et al. "Close to 0 ms HO interruption time for single TX-RX UE"; 3GPP TSG-RAN WG2 #97bis R2-1703382; Apr. 3, 2017.
Nokia Corp et al. "TDM based dual connectivity for single rx/tx UE"; 3GPP TSG-RAN WG2 Meeting #83bis R2-133368; Oct. 7, 2013.

* cited by examiner

MULTI-CONNECTIVITY USING TIME DIVISION MULTIPLEXING

PRIORITY CLAIM

This application is a U.S. National Stage filing of International Application No. PCT/US2019/052398, filed Sep. 23, 2019, titled "MULTI-CONNECTIVITY USING TIME DIVISION MULTIPLEXING", which claims the benefit of priority to the U.S. Provisional Application No. 62/737,075, filed Sep. 26, 2018, titled "MULTI-CONNECTIVITY USING TIME DIVISION MULTIPLEXING (TDM) APPROACH". All of the aforementioned applications are incorporated herein by reference in their entireties.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for multi-connectivity (e.g., in connection with a handover) using time-division multiplexing (TDM) approach.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques for multi-connectivity (e.g., in connection with a handover) using a TDM approach in wireless networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects set forth in the claims encompass all available equivalents of those claims.

Figure 1A:
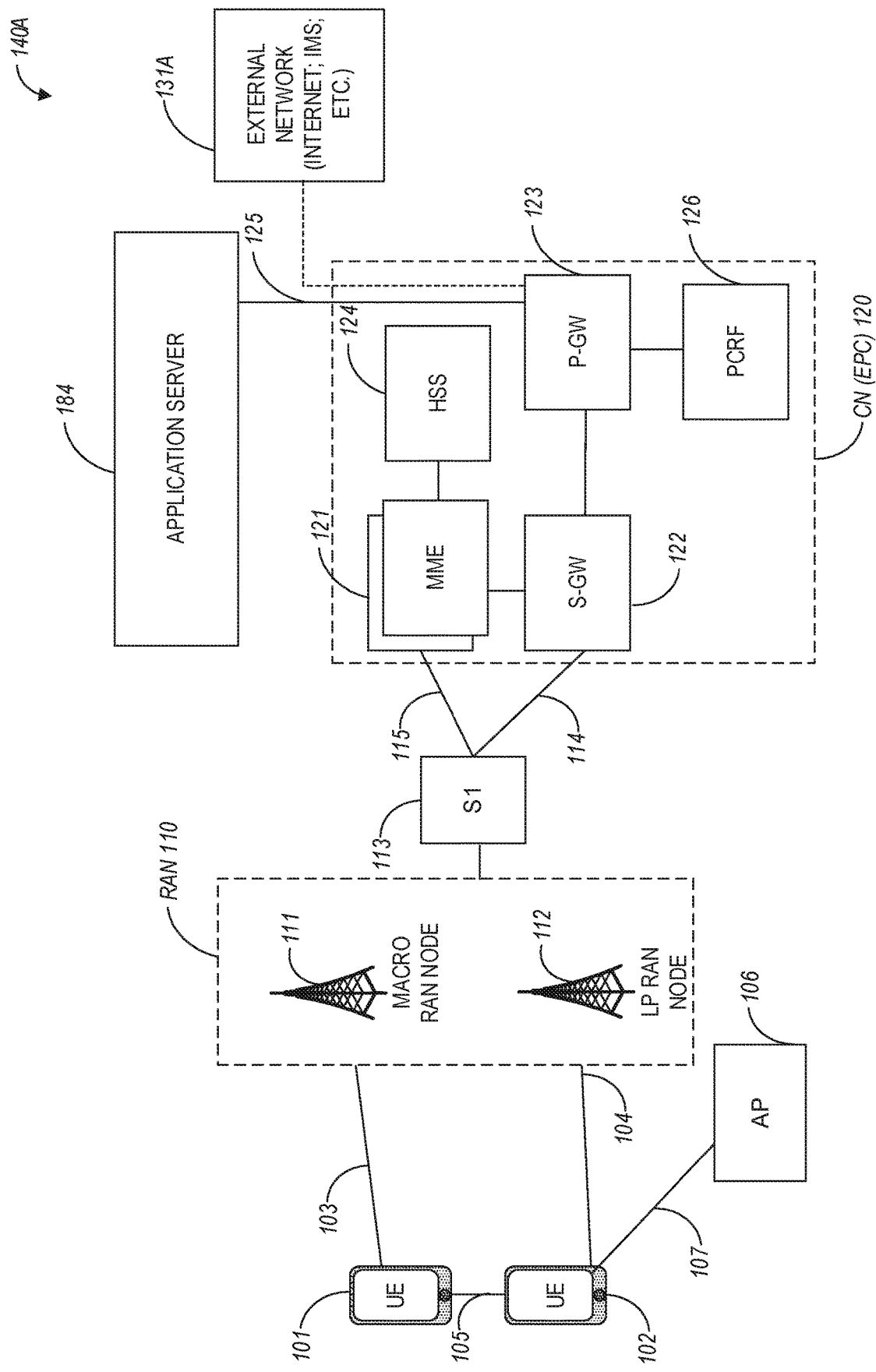
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touch-screen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1i). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
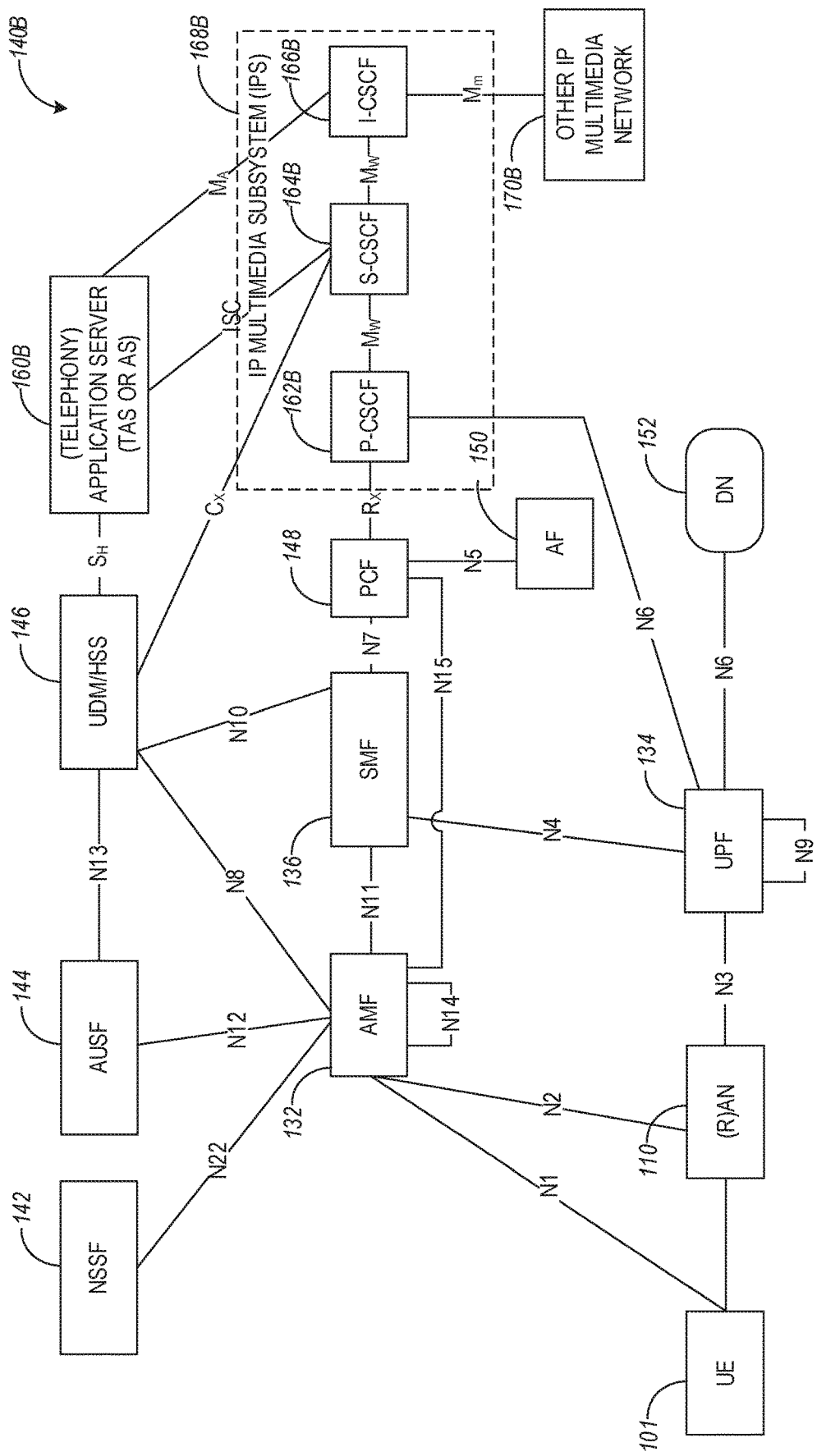
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
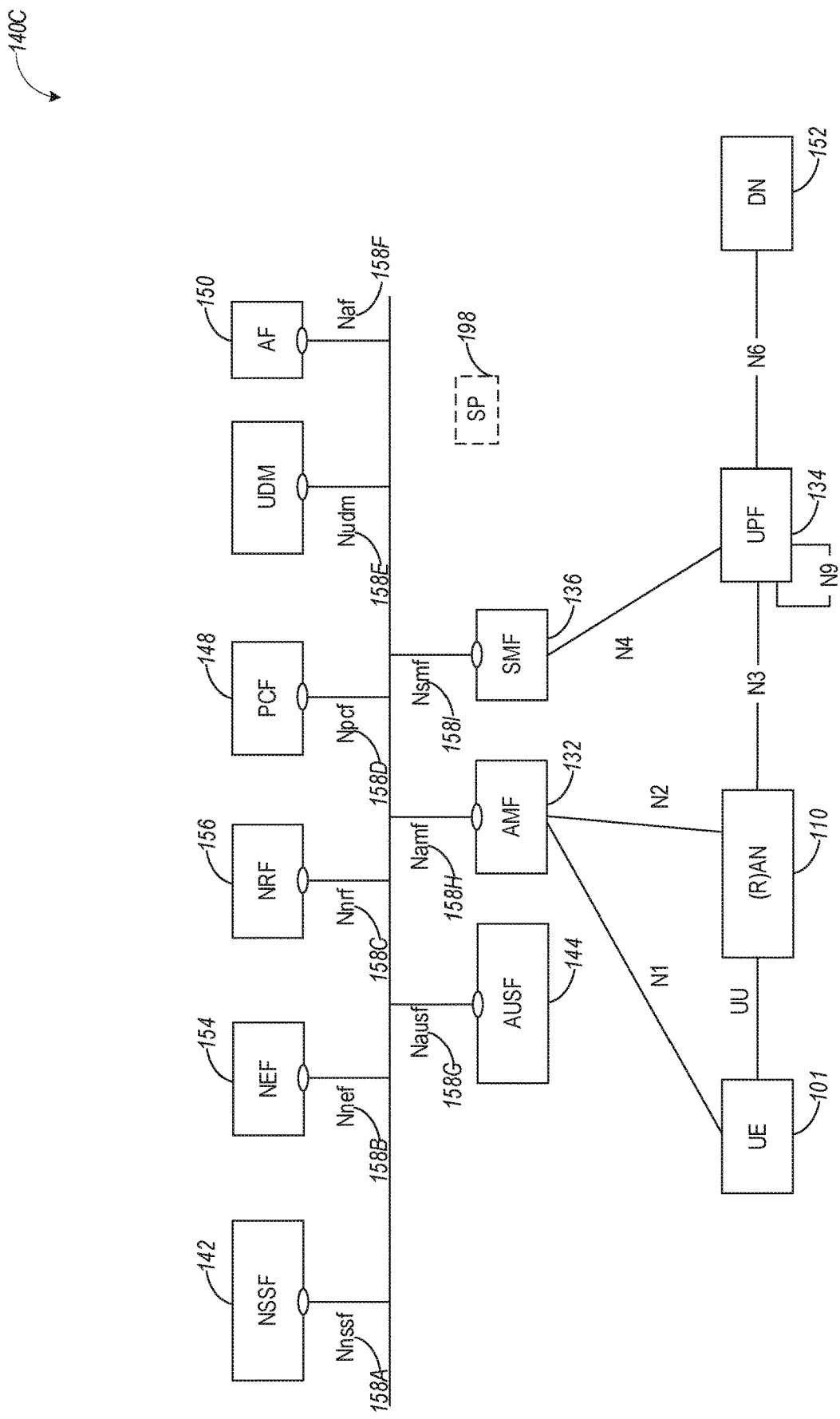

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Figure 2:
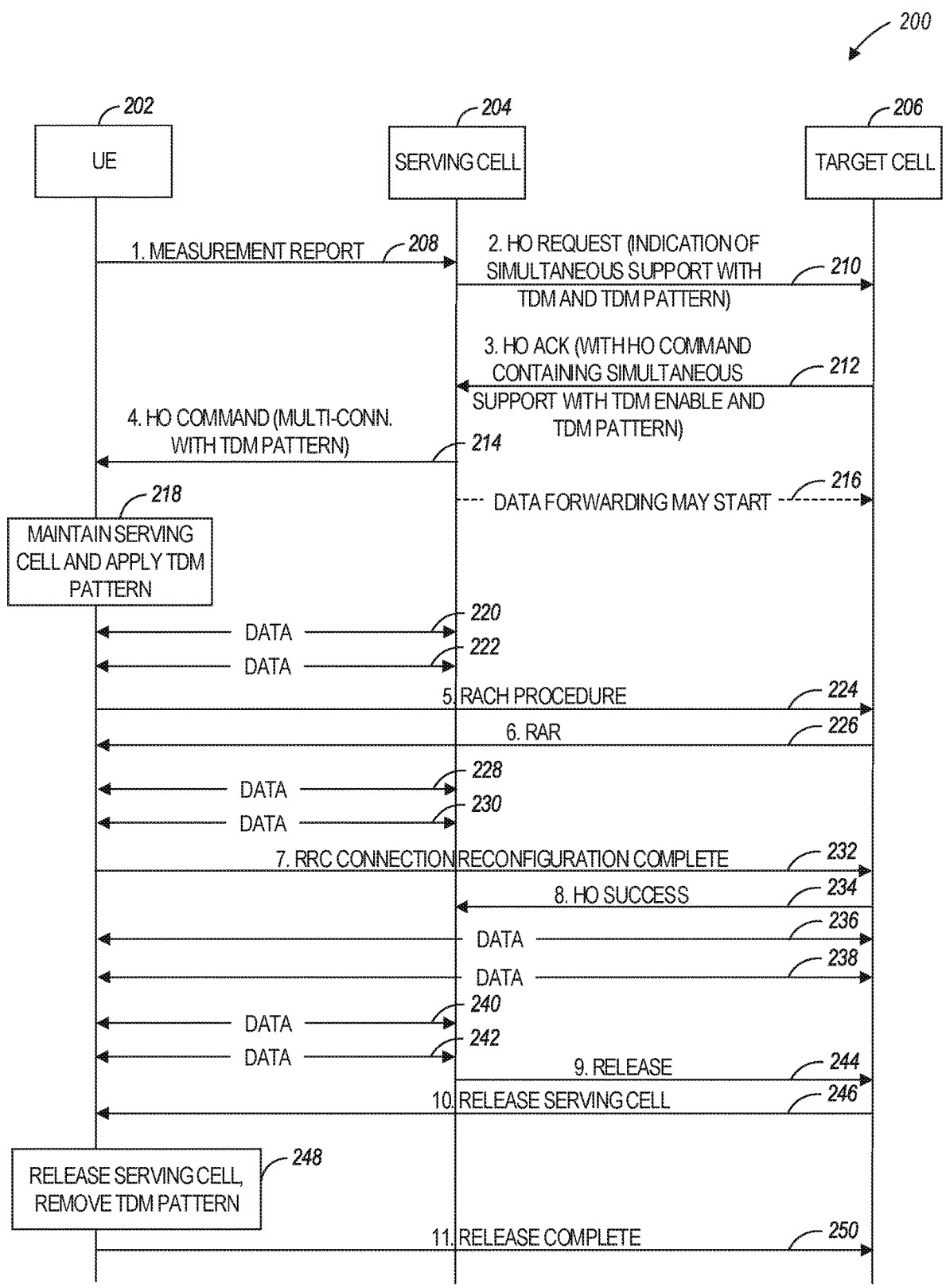
FIG. 2 illustrates a swimlane diagram of a handover using TDM multi-connectivity, in accordance with some aspects.

In some aspects, if the UE does not support multiple RF chains, which allows the UE to perform simultaneous Tx/Rx to/from both a serving cell and a target cell, TDM can be considered (e.g., in connection with multi-connectivity during a handover as illustrated in FIG. 2).

The following options may be used to enable TDM multi-connectivity for a UE:

- Option 1: in aspects when the UE supports multi-connectivity handover, all intra-frequency HO will by default enable TDM multi-connectivity.
- Option 2: in aspects when the UE indicates (e.g., in the UE capability information) that the UE supports only TDM multi-connectivity HO for all cases.
- Option 3: in aspects when the source and target cells are not within the UE supported carrier aggregation (CA) band combinations.
- Option 4: in aspects when the source and target cells are not within the UE supported dual connectivity (DC) band combinations.
- Option 5: the UE may indicate (e.g., using new capability signaling) which band combination of multi-connectivity HO is supported and the remaining bands may be used for TDM multi-connectivity HO.

In TDM multi-connectivity handover, a UE is configured with a TDM pattern which can indicate a pattern for multiplexing time and/or frequency resources for performing communication with a serving cell and a target cell in a TDM manner. For example, the TDM pattern can be used to indicate when the UE can transmit uplink data to (or received downlink data from) the serving cell while being in a handover procedure with the target cell. TDM multi-connectivity handover is further illustrated in FIG. 2.

FIG. 2 illustrates a swimlane diagram 200 of a handover using TDM-based multi-connectivity, in accordance with some aspects. Referring to FIG. 2, at operation 208, a measurement report (for target cell 206) is communicated from UE 202 to a serving cell 204 when a measurement event is triggered. The measurement event can be configured prior to operation 208, by the serving cell 204. The serving cell 204 can make a handover decision for a handover to the target cell 206 based on the received measurement report at operation 208.

At operation 210, the serving cell 204 communicates a handover request to the target cell 206. The handover request can include an indication of a TDM enable as well as a TDM pattern provided by the serving cell 204. The TDM enable indicates to the target cell 206 that the serving cell 204 supports TDM-based multi-connectivity.

- Option 1: In some aspects, the source (e.g., serving cell 204) proposes a TDM pattern (implicitly by including pattern or explicitly over the Xn interface). In this step, the serving cell may also send a suggested TDM pattern to the target cell. If the target cell accepts the TDM pattern, it may include the TDM pattern in the HO command.
- Option 2: In some aspects, the target cell may suggest a new pattern (e.g., via step 3 at operation 212), which the serving cell can either accept or reject. The serving cell 204 may send the TDM pattern to the target cell after receiving an acceptance (e.g., an HO ACK potential information with the support of multi-connectivity HO and TDM) from the target cell. After the TDM pattern is accepted by both the serving cell and the target cell, the target cell may generate the TDM pattern and include it in the HO command. Since option 2 may introduce additional delay, option 1 may be preferred.
- Option 3: In some aspects, a class-1 Xn Application Protocol (XnAP) procedure may be used by the serving cell and the target cell for further negotiation of a TDM pattern.
- Option 4: In some aspects, an HO command can be created, which has a two-part generation—one part of the command is generated by the serving cell (e.g., the TDM pattern) and a remaining part of the HO command is generated by the target cell.

At operation 212, the target cell 206 communicates a handover acknowledgment to the serving cell 204. The handover acknowledgment can include a handover command for TDM-based multi-connectivity handover with a TDM enable indicator (e.g., to indicate that the target cell supports TDM-based multi-connectivity) and a TDM pattern.

In aspects when the target cell 206 supports TDM-based multi-connectivity, the target cell responds (at operation 212) with a HO command (containing required HO parameters such as random access channel (RACH) procedure parameters) to the serving cell 204 as well as an Xn message to indicate the support, if the serving cell cannot read the HO command.

If the target cell does not support TDM-based multi-connectivity, the target cell may reject the HO request for TDM-based multi-connectivity HO and proceed with a regular HO. In this case, the HO command will still be generated with an indication of no TDM-based multi-connectivity support (similarly, an Xn message may be used if the serving cell cannot read the HO command communicated at operation 212):

- Option 1: In some aspects, the target cell can only accept or reject the TDM pattern provided by the serving cell at operation 210. If rejected, a regular HO will be performed. If the target cell accepts the proposed TDM pattern, the TDM pattern may be included in the HO command and may be sent to the UE (at operation 212).
- Option 2: In some aspects, the target cell may provide a suggested (new) TDM pattern to the serving cell via an Xn interference. In this case, the serving cell may either accept or reject and proceed with a regular HO. This option may introduce additional delay and, therefore, option 1 may be preferred.
- Option 3: In some aspects, the target cell makes the final decision on the TDM pattern. For example, the target cell 206 may accept the TDM pattern suggested by the serving cell 204 or create a new TDM pattern. The latter case may have a problem with serving cell but it may just not send data if not compatible.

At operation 214, the serving cell 204 communicates a handover command for a TDM-based multi-connectivity handover, which command may also include the TDM pattern. More specifically, the serving cell may read the response from the target cell for the case of HO with simultaneous support (i.e., multi-connectivity with the target and serving cells) with TDM, or a regular HO, or reject an HO. Then the serving cell forwards the HO command to the UE at operation 214 (the HO command may include simultaneous support with TDM option enabled to indicate the TDM-based multi-connectivity is enabled for the UE using the indicated TDM pattern).

After the handover command is communicated at operation 214, at operation 216, the serving cell tool can store data forwarding of UE uplink or downlink data to the target cell 206.

At operation 218, UE 202 initiates the handover while maintaining connectivity with the serving cell and applying the TDM pattern to subsequent communications with the serving cell. For example, data communications 220 and 222 between the UE 202 and the serving cell 204 are performed based on the TDM pattern received with the handover command at operation 214. Furthermore, FIG. 2 illustrates additional data communications 228, 230, 240, and 242 between the UE 202 and the serving cell 204, which communications can be time-division multiplexed with communications between the UE and the target cell based on the TDM pattern.

At operation 224, UE 202 performs a RACH procedure with the target cell 206. In case of an HO with TDM-based multi-connectivity, the UE maintains the serving cell connection. If the UE receives the TDM pattern at operation 214, the UE may apply it immediately to the serving cell and perform the RACH procedure to target. Otherwise, the UE performs RACH to access the target cell using the RACH information in the HO command provided by the target cell and communicated to the UE at operation 214. Alternatively, once the RACH procedure is successful, the target cell 206 may send the TDM pattern to the UE once it is finalized with the serving cell. However, this option may not be preferred due to RRC delay.

At operation 226, the target cell 206 indicates a response message to indicate successful completion of the RACH procedure. At operation 232, the UE 22 indicates an RRC Connection Reconfiguration Complete message to the target cell 206 to indicate HO completion.

At operation 234, the target cell 206 sends an HO success indication to the serving cell 204. After the handover success indication, data communications 236 and 238 can be performed between the UE and the target cell, which communications are down division multiplexed with data communications 240 and 242 between the UE and the serving cell, based on the TDM pattern.

At operation 244, serving cell 204 communicates a release message to the target cell 206. At operation 246, the target cell 206 communicates a serving cell release message to the UE 202. At operation 248, the UE releases the serving cell and removes the TDM pattern. At operation 250, the UE communicates a release complete message indicates that the serving cell has been released and the TDM pattern is removed.

In some aspects, synchronization between the serving cell and the target cell may be performed using one of the following options.

Option 1: In some aspects, synchronization between the serving cell and the target cell may be performed by the network (e.g., by Operations and Management (OEM) node or functionality).

Option 2: In some aspects, synchronization between the serving cell and the target cell may be performed using sub-frame timing difference (SFTD). More specifically, the SFTD may be indicated to the UE in advance (e.g., the serving cell may indicate in the measurement configuration that the serving cell supports TDM and multi-connectivity HO) and the serving cell may ask the UE to measure SFTD and provide the SFTD together with (or as part of) the measurement report. This option may be used to reduce the delay during HO.

Figure 3:
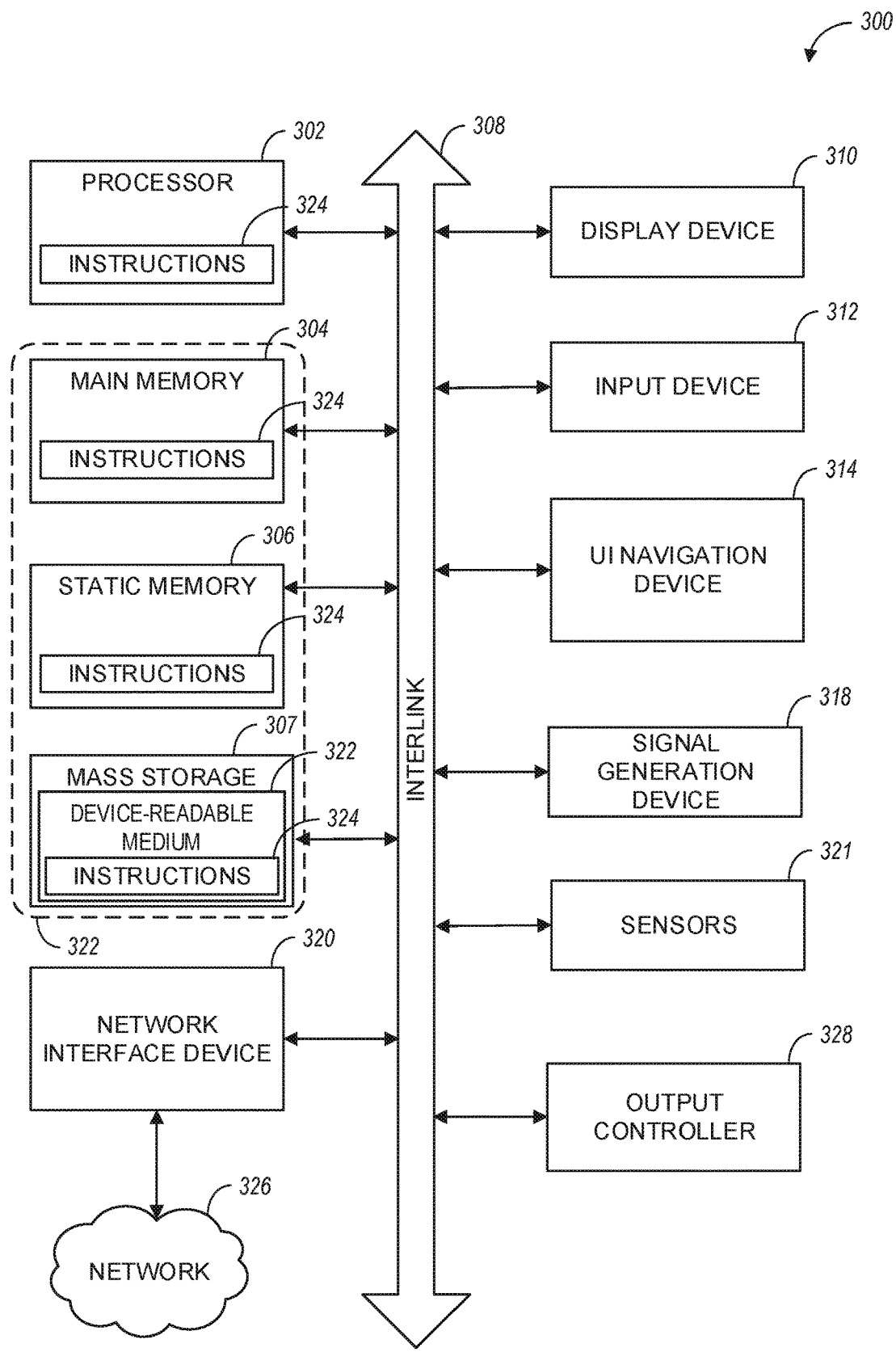
FIG. 3 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 3 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 300 may operate as a standalone device or may be connected (e.g., networked) to other communication devices.

Circuitry (e.g., processing circuitry) is a collection of circuits implemented in tangible entities of the device 300 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 300 follow.

In some aspects, the device 300 may operate as a stand-alone device or may be connected (e.g., networked) to other devices. In a networked deployment, the communication device 300 may operate in the capacity of a server communication device, a client communication device, or both in server-client network environments. In an example, the communication device 300 may act as a peer communication device in peer-to-peer (P2P) (or other distributed) network environment. The communication device 300 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 300 may include a hardware processor 302 (e.g., a central processing unit (CPU), a graphics processing unit (GPU), a hardware processor core, or any combination thereof), a main memory 304, a static memory 306, and mass storage 307 (e.g., hard drive, tape drive, flash storage, or other block or storage devices), some or all of which may communicate with each other via an interlink (e.g., bus) 308.

The communication device 300 may further include a display device 310, an alphanumeric input device 312 (e.g., a keyboard), and a user interface (UI) navigation device 314 (e.g., a mouse). In an example, the display device 310, input device 312 and UI navigation device 314 may be a touchscreen display. The communication device 300 may additionally include a signal generation device 318 (e.g., a speaker), a network interface device 320, and one or more sensors 321, such as a global positioning system (GPS) sensor, compass, accelerometer, or another sensor. The communication device 300 may include an output controller 328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 307 may include a communication device-readable medium 322, on which is stored one or more sets of data structures or instructions 324 (e.g., software) embodying or utilized by any one or more of the techniques or functions described herein. In some aspects, registers of the processor 302, the main memory 304, the static memory 306, and/or the mass storage 307 may be, or include (completely or at least partially), the device-readable medium 322, on which is stored the one or more sets of data structures or instructions 324, embodying or utilized by any one or more of the techniques or functions described herein. In an example, one or any combination of the hardware processor 302, the main memory 304, the static memory 306, or the mass storage 316 may constitute the device-readable medium 322.

As used herein, the term "device-readable medium" is interchangeable with "computer-readable medium" or "machine-readable medium". While the communication device-readable medium 322 is illustrated as a single medium, the term "communication device-readable medium" may include a single medium or multiple media (e.g., a centralized or distributed database, and/or associated caches and servers) configured to store the one or more instructions 324. The term "communication device-readable medium" is inclusive of the terms "machine-readable medium" or "computer-readable medium", and may include any medium that is capable of storing, encoding, or carrying instructions (e.g., instructions 324) for execution by the communication device 300 and that cause the communication device 300 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 324 may further be transmitted or received over a communications network 326 using a transmission medium via the network interface device 320 utilizing any one of a number of transfer protocols. In an example, the network interface device 320 may include one or more physical jacks (e.g., Ethernet, coaxial, or phone jacks) or one or more antennas to connect to the communications network 326. In an example, the network interface device 320 may include a plurality of antennas to wirelessly communicate using at least one of single-input-multiple-output (SIMO), MIMO, or multiple-input-single-output (MISO) techniques. In some examples, the network interface device 320 may wirelessly communicate using Multiple User MIMO techniques.

The term "transmission medium" shall be taken to include any intangible medium that is capable of storing, encoding or carrying instructions for execution by the communication device 300, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. A source base station (SBS), comprising:
a radio; and
a processor operably connected to the radio and configured to cause the SBS to:
decode a measurement report from a user equipment (UE), the measurement report triggered based on a measurement event configured by the SBS;
encode, in response to the measurement report, a handover request for transmission to a target base station (TBS), the handover request including a first indication of support associated with a time-division multiplexing (TDM)-based multi-connectivity handover, the first indication comprising a first TDM enable, wherein TDM-based multi-connectivity handover includes TDM of uplink transmission from the UE to the SBS and to the TBS;
decode, in response to the handover request, a handover acknowledgement including a second indication of support associated with the TDM-based multi-connectivity handover, the second indication comprising a second TDM enable;
encode radio resource control (RRC) signaling for transmission to the UE, the RRC signaling including a handover command from the TBS;
decode uplink (UL) data received from the UE and encode downlink (DL) data to the UE after transmission of the RRC signaling, wherein transmission of the UL data is time-division multiplexed with communications between the UE and the TBS during the handover; and
after successful completion of a random access channel (RACH) procedure between the UE and the TBS during the handover, release the UE.

2. The SBS of claim 1, wherein the processor is further configured to cause the SBS to:
encode a handover request for transmission to the TBS.

3. The SBS of claim 2, wherein the processor is further configured to cause the SBS to:
decode a handover acknowledgment from the TBS, the handover acknowledgment received in response to the handover request and including the handover command for transmission to the UE.

4. The SBS of claim 2, wherein the processor is further configured to cause the SBS to:
decode a handover acknowledgment from the TBS, the handover acknowledgment received in response to the handover request.

5. The SBS of claim 4, wherein the processor is further configured to cause the SBS to:
encode the RRC signaling for transmission to the UE, the RRC signaling including the handover command for multi-connectivity between the UE, the SBS, and the TBS during the handover.

6. The SBS of claim 2, wherein the processor is further configured to cause the SBS to:
perform an Xn Application Protocol (XnAP) class-1 procedure with the TBS to negotiate the handover; and
encode the RRC signaling for transmission to the UE, the RRC signaling including the handover command for multi-connectivity between the UE, the SBS, and the TBS during the handover.

7. The SBS of claim 1, wherein the processor is further configured to cause the SBS to:
encode configuration signaling for transmission to the UE, the configuration signaling to configure the measurement event and a sub-frame timing difference (SFTD) between the UE and the TBS;
determine the SFTD based on the measurement report; and
perform synchronization with the TBS based on the determined SFTD.

8. A method, comprising:
decoding a measurement report from a user equipment (UE), the measurement report triggered based on a measurement event configured by a source base station (SBS);
encoding, in response to the measurement report, a handover request for transmission to a target base station (TBS), the handover request including a first indication of support associated with a time-division multiplexing (TDM)-based multi-connectivity handover, wherein TDM-based multi-connectivity handover includes TDM of uplink transmission from the UE to the SBS and to the TBS;
decoding, in response to the handover request, a handover acknowledgement including a second indication of support associated with the TDM-based multi-connectivity handover, the second indication comprising a second TDM enable;
encoding radio resource control (RRC) signaling for transmission to the UE, the RRC signaling including a handover command from the TBS;
decoding uplink (UL) data received from the UE and encode downlink (DL) data to the UE after transmission of the RRC signaling, wherein transmission of the UL data is time-division multiplexed with communications between the UE and the TBS during the handover; and
after successful completion of a random access channel (RACH) procedure between the UE and the TBS during the handover, releasing the UE.

9. The method of claim 8, further comprising:
encoding a handover request for transmission to the TBS.

10. The method of claim 9, further comprising:
decoding a handover acknowledgment from the TBS, the handover acknowledgment received in response to the handover request and including the handover command for transmission to the UE.

11. The method of claim 9, further comprising:
decoding a handover acknowledgment from the TBS, the handover acknowledgment received in response to the handover request.

12. The method of claim 9, further comprising:
encoding the RRC signaling for transmission to the UE, the RRC signaling including the handover command for multi-connectivity between the UE, the SBS, and the TBS during the handover.

13. The method of claim 9, further comprising:
performing an Xn Application Protocol (XnAP) class-1 procedure with the TBS to negotiate the handover; and
encoding the RRC signaling for transmission to the UE, the RRC signaling including the handover command for multi-connectivity between the UE, the SBS, and the TBS during the handover.

14. The method of claim 8, further comprising:
encoding configuration signaling for transmission to the UE, the configuration signaling to configure the measurement event and a sub-frame timing difference (SFTD) between the UE and the TBS;

determining the SFTD based on the measurement report; and performing synchronization with the TBS based on the determined SFTD.

15. The method of claim 8, further comprising:

decoding the UL data received from the UE, wherein transmission of the UL data is time-division multiplexed with a RACH procedure between the UE and the TBS during the handover.

16. A processor configured to perform operations, the operations comprising:

decoding a measurement report from a user equipment (UE), the measurement report triggered based on a measurement event configured by a source base station (SBS);

encoding, in response to the measurement report, a handover request for transmission to a target base station (TBS), the handover request including a first indication of support associated with a time-division multiplexing (TDM)-based multi-connectivity handover, the first indication comprising a first TDM enable, wherein TDM-based multi-connectivity handover includes TDM of uplink transmission from the UE to the SBS and to the TBS;

decoding, in response to the handover request, a handover acknowledgement including a second indication of support associated with the TDM-based multi-connectivity handover, the second indication comprising a second TDM enable;

encoding radio resource control (RRC) signaling for transmission to the UE, the RRC signaling including a handover command from the TBS;

decoding uplink (UL) data received from the UE and encode downlink (DL) data to the UE after transmission of the RRC signaling, wherein transmission of the UL data is time-division multiplexed with communications between the UE and the TBS during the handover; and after successful completion of a random access channel (RACH) procedure between the UE and the TBS during the handover, releasing the UE.

17. The processor of claim 16, wherein the handover request further includes an indication of a first TDM pattern and the handover acknowledgement further includes an indication of a second TDM pattern.

18. The processor of claim 17, wherein the first TDM pattern and the second TDM pattern are the same.

19. The processor of claim 17, wherein the first TDM pattern and the second TDM pattern are different.

20. The processor of claim 16, wherein the handover command from the TBS includes a TDM pattern accepted by both the SBS and the TBS.

* * * * *